(12) United States Patent
Aratani et al.

(10) Patent No.: US 7,808,555 B2
(45) Date of Patent: Oct. 5, 2010

(54) IMAGE DISPLAY METHOD AND IMAGE DISPLAY APPARATUS WITH ZOOM-IN TO FACE AREA OF STILL IMAGE

(75) Inventors: Shuntaro Aratani, Machida (JP); Tomoyuki Ohno, Zama (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1150 days.

(21) Appl. No.: 11/423,556

(22) Filed: Jun. 12, 2006

(65) Prior Publication Data

US 2006/0285034 A1 Dec. 21, 2006

(30) Foreign Application Priority Data

Jun. 15, 2005 (JP) ............................. 2005-175380

(51) Int. Cl.
  H04N 5/44 (2006.01)
  H04N 9/74 (2006.01)
  H04N 5/222 (2006.01)
(52) U.S. Cl. .................. 348/578; 348/561; 348/333.05
(58) Field of Classification Search ............ 348/333.05, 348/578, 700, 701, 718, 231.2, 169, 561; 382/118, 195, 305, 103; 386/52, 68, 69, 386/83; 715/723, 726, 730; 345/672, 682
See application file for complete search history.

(56) References Cited

U.S. PATENT DOCUMENTS

| | | | |
|---|---|---|---|
| 6,297,846 B1 | 10/2001 | Edanami | 348/239 |
| 7,075,569 B2 * | 7/2006 | Niikawa | 348/218.1 |
| 7,196,733 B2 | 3/2007 | Aratani et al. | 348/581 |
| 7,286,723 B2 * | 10/2007 | Taugher et al. | 382/305 |
| 7,362,946 B1 * | 4/2008 | Kowald | 386/52 |
| 7,574,016 B2 * | 8/2009 | Steinberg et al. | 382/103 |
| 2004/0027369 A1 | 2/2004 | Kellock et al. | 345/716 |
| 2004/0100487 A1 * | 5/2004 | Mori et al. | 345/724 |
| 2004/0117830 A1 | 6/2004 | Ohno et al. | 725/51 |
| 2004/0160532 A1 * | 8/2004 | Sun | 348/559 |
| 2004/0261103 A1 | 12/2004 | Ohno et al. | 725/38 |
| 2004/0263664 A1 | 12/2004 | Aratani et al. | 348/333.12 |
| 2005/0044112 A1 | 2/2005 | Yamamoto et al. | 707/104.1 |
| 2005/0081247 A1 * | 4/2005 | Lipsky et al. | 725/109 |
| 2005/0206751 A1 * | 9/2005 | Manico et al. | 348/239 |
| 2006/0001771 A1 * | 1/2006 | Hayakawa | 348/553 |
| 2006/0256243 A1 * | 11/2006 | Shen et al. | 348/729 |
| 2006/0284810 A1 | 12/2006 | Aratani et al. | 345/90 |

(Continued)

FOREIGN PATENT DOCUMENTS

JP 10-051755 2/1998

(Continued)

*Primary Examiner*—Victor Kostak
(74) *Attorney, Agent, or Firm*—Fitzpatrick, Cella, Harper & Scinto

(57) ABSTRACT

An image display method of adding a special effect to a plurality of images, changing the plurality of images in time series, and sequentially displaying the plurality of images, the method including an input step of inputting an image, a detection step of detecting a feature area from the input image, a determination step of determining the content of the special effect of a target image on the basis of the detected feature area and the special effect of a previous image which is displayed prior to the detected target image, and a display control step of displaying the image with the determined special effect.

13 Claims, 18 Drawing Sheets

U.S. PATENT DOCUMENTS

2006/0285034 A1   12/2006   Aratani et al. ................ 349/90

FOREIGN PATENT DOCUMENTS

| JP | 2002-281450 | 9/2002 |
| JP | 2004-343472 | 12/2004 |
| JP | 2005-033276 | 2/2005 |
| JP | 2005-056387 | 3/2005 |

* cited by examiner

FIG. 4

| FACE DETECTION COUNT | PROCESSING OF PREVIOUS IMAGE (END STATE) | DETERMINATION PROCESSING | | |
|---|---|---|---|---|
| | | DISPLAY EFFECT OF IMAGE | SWITCHING EFFECT CONDITION FROM PREVIOUS IMAGE | FACE DISPLAY POSITION/SIZE CONDITION AT START OF DISPLAY EFFECT |
| 1 | NONE | ZOOM-IN FROM ENTIRE IMAGE TO FACE AREA (FACE ZOOM STATE) | NONE | NONE |
| | FADE-IN/OUT (BLACK DISPLAY) | | | |
| | ZOOM-OUT (FULL VIEW) | | | |
| | ZOOM-IN (FACE ZOOM STATE) | ZOOM OUT (FULL VIEW) ※ AFTER ZOOM DISPLAY OF FACE AREA | α COMPOSITION WITH PREVIOUS IMAGE | MATCH WITH END STATE OF PREVIOUS IMAGE |
| | PANNING (FACE ZOOM STATE) | | | |
| 2 ≤ | NONE | PANNING BETWEEN FACE AREAS AT TWO ENDS (FACE ZOOM STATE) | NONE | NONE |
| | FADE-IN/OUT (BLACK DISPLAY) | | | |
| | ZOOM-OUT (FULL VIEW) | | | |
| | ZOOM-IN (FACE ZOOM STATE) | PANNING BETWEEN FACE AREAS AT TWO ENDS ※AFTER ZOOM DISPLAY OF ONE FACE AREA (FACE ZOOM STATE) | α COMPOSITION WITH PREVIOUS IMAGE | MATCH WITH END STATE OF PREVIOUS IMAGE |
| | PANNING (FACE ZOOM STATE) | | | |
| 0 | (UNCONCERNED) | FADE-IN/OUT (BLACK DISPLAY) | NONE | NONE |

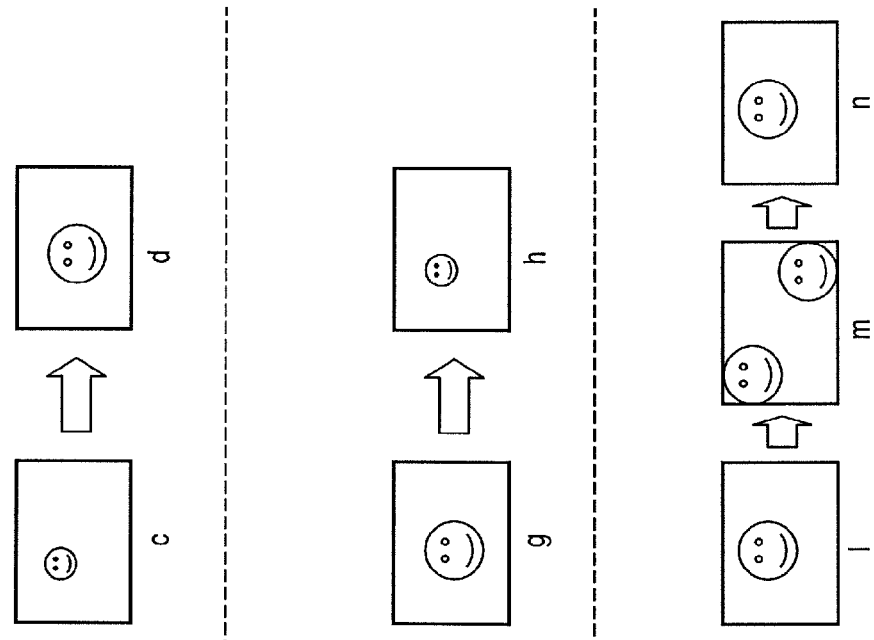
FIG. 5A
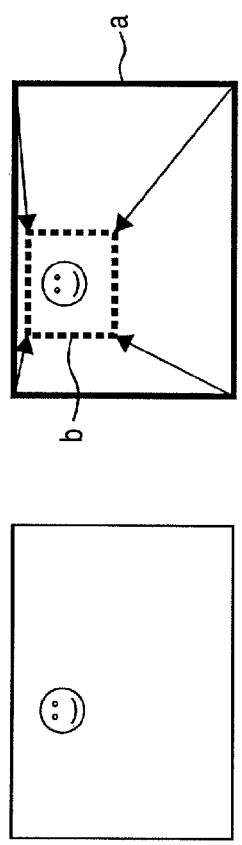
FIG. 5B
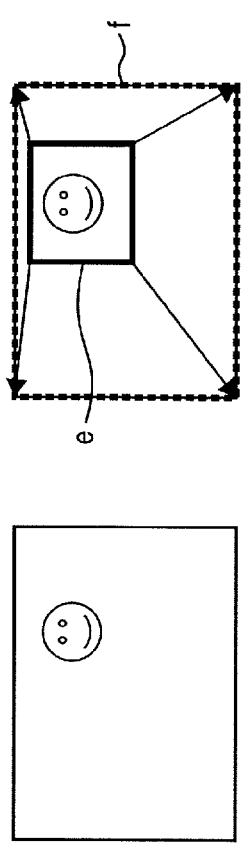
FIG. 5C
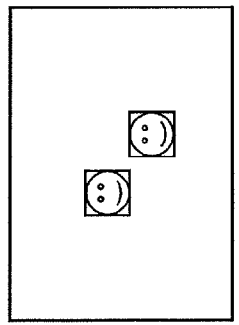

 FIG. 6A  FIG. 6B  FIG. 6C  FIG. 6D  FIG. 6E (α COMPOSITION)  FIG. 6F  FIG. 6G  FIG. 6H (NO α COMPOSITION)  FIG. 6I  FIG. 6J  FIG. 6K  FIG. 6L (α COMPOSITION)  FIG. 6M  FIG. 6N 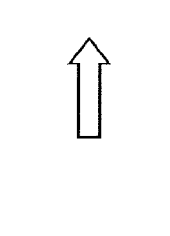 FIG. 6O

FIG. 10

| FACE DETECTION COUNT | PROCESSING OF PREVIOUS IMAGE (END STATE) | DETERMINATION PROCESSING | | |
|---|---|---|---|---|
| | | DISPLAY EFFECT OF IMAGE | SWITCHING EFFECT CONDITION FROM PREVIOUS IMAGE | FACE DISPLAY POSITION/SIZE/ FACE SELECTION CONDITION AT START OF DISPLAY EFFECT |
| 1 | NONE | ZOOM-IN FROM ENTIRE IMAGE TO FACE AREA (FACE ZOOM STATE) | NONE | NONE |
| | FADE-IN/OUT (BLACK DISPLAY) | | | |
| | ZOOM-OUT (FULL VIEW) | | | |
| | ZOOM-IN (FACE ZOOM STATE) | ZOOM OUT (FULL VIEW) ※ AFTER ZOOM DISPLAY OF FACE AREA | α COMPOSITION WITH PREVIOUS IMAGE | MATCH WITH END STATE OF PREVIOUS IMAGE |
| | PANNING (FACE ZOOM STATE) | | | |
| 2 ≤ | NONE | PANNING BETWEEN FACE AREAS AT TWO ENDS (FACE ZOOM STATE) | NONE | NONE |
| | FADE-IN/OUT (BLACK DISPLAY) | | | |
| | ZOOM-OUT (FULL VIEW) | | | |
| | ZOOM-IN (FACE ZOOM STATE) | PANNING BETWEEN FACE AREAS AT TWO ENDS ※ AFTER ZOOM DISPLAY OF ONE FACE AREA (FACE ZOOM STATE) | α COMPOSITION WITH PREVIOUS IMAGE | DISPLAY POSITION AND SIZE ARE MADE TO MATCH WITH THOSE OF PREVIOUS IMAGE IN END STATE, AND FACE WHICH MATCHES DISPLAYED PERSON IS PREFERENTIALLY DISPLAYED |
| | PANNING (FACE ZOOM STATE) | | | |
| 0 | (UNCONCERNED) | FADE-IN/OUT (BLACK DISPLAY) | NONE | NONE |

α COMPOSITION

FACE DETECTION RESULT: 1
POSITION : (557,496)
SIZE : r = 120
PERSON :B

FACE DETECTION RESULT: 2
(i) POSITION : (650,456)
    SIZE : r = 60
    PERSON :A
(ii) POSITION : (849,596)
    SIZE : r = 58
    PERSON :B

FIG. 14

| No. | FILE NAME | FACE RECOGNITION RESULT | DISPLAY STATUS |
|---|---|---|---|
| 1 | IMG_0001.jpg | A | UNDISPLAYED |
| 2 | IMG_0002.jpg | B | UNDISPLAYED |
| 3 | IMG_0003.jpg | A | UNDISPLAYED |
| 4 | IMG_0004.jpg | C | UNDISPLAYED |
| 5 | IMG_0005.jpg | A,B | UNDISPLAYED |
| 6 | IMG_0006.jpg | C | UNDISPLAYED |
| 7 | IMG_0007.jpg | A,C | UNDISPLAYED |

IMAGE DISPLAY METHOD AND IMAGE DISPLAY APPARATUS WITH ZOOM-IN TO FACE AREA OF STILL IMAGE

FIELD OF THE INVENTION

The present invention relates to an image display technique of displaying image data on a screen.

BACKGROUND OF THE INVENTION

Digital High-Vision broadcasting is starting, and it becomes possible to enjoy more impressive images of higher qualities than conventional ones at home along with the prevalence of high-definition television receivers (to be also simply referred to as TV sets hereinafter). As electronic still cameras become popular, many users display electronic still and moving images on the monitors of personal computers and TV sets and enjoy the displayed images.

In this situation, there are increasing user demands to not only display photographed still and moving images on TV sets, but also to "passively" view such images like television programs or enjoy them with presentations and audio video effects like television programs and movies.

Slide show display is a method of sequentially displaying digital image data without any user operation. As a method of adding an effect to slide show display, there are proposed a method of controlling a display switching effect in accordance with the settings of the display switching effect added in advance to distributed still images, as disclosed in Japanese Patent Laid-Open No. 2002-281450, and a method of allowing the user to freely change the display switching effect to another one.

Japanese Patent Laid-Open No. 2004-343472 proposes a method of generating a frame image composited by superposing a next frame image on a previous frame image on the basis of resolution information of the previous frame image and that of the next frame image in slide show display.

Japanese Patent Laid-Open No. 2005-033216 proposes a method of choosing and playing back an image of high similarity to a specific person designated by the user or designated at random in slide show display.

However, the technique described in Japanese Patent Laid-Open No. 2002-281450 requires a work to add an effect by the contents creator in order to add a high display effect to a slide show. In addition, the user can only exchange a still image switching effect control instruction with another switching effect control instruction. That is, according to the conventional technique, it is difficult to automatically or easily add a display effect appropriate for the contents of each photograph.

According to the technique described in Japanese Patent Laid-Open No. 2004-343472, an image of a small display size can be so displayed as to prevent a margin from standing out. However, it is difficult to automatically or easily add a display effect suitable for the contents of each photograph.

According to the technique described in Japanese Patent Laid-Open No. 2005-033276, images of the same person can be displayed at once by a slide show. However, it is impossible to add a display effect proper for the contents of each photograph or give continuity between successive display effects.

SUMMARY OF THE INVENTION

The present invention has been made to overcome the conventional drawbacks, and has as its object to implement an image display technique capable of setting a display effect and providing a more effective display which reflects a feature in an image without performing any cumbersome operation by a viewing user in a slide show of sequentially displaying digital images.

In order to achieve the above object, there is provided an image display method of adding a special effect to a plurality of images, changing the plurality of images in time series, and sequentially displaying the plurality of images, the method comprising an input step of inputting an image; a detection step of detecting a feature area from the input image; a determination step of determining a content of the special effect of a target image on the basis of the detected feature area and a special effect of a previous image which is displayed prior to the detected target image; and a display control step of displaying the image with the determined special effect.

There is also provided an image display apparatus which adds a special effect to a plurality of images, changes the plurality of images in time series, and sequentially displays the plurality of images, the apparatus comprising an input unit adapted to input an image; a detection unit adapted to detect a feature area from the input image; a determination unit adapted to determine a content of the special effect of a target image on the basis of the detected feature area and a special effect of a previous image which is displayed prior to the detected target image; and a display controller adapted to display the image with the determined special effect.

The present invention includes a program for causing a computer to execute the image display method, and a computer-readable recording medium which stores the program.

According to the present invention, for example, in performing slide show display of adding a special effect to a plurality of images, changing the images in time series, and sequentially displaying the images, the contents of a special effect are determined on the basis of a feature area in an image and the special effect of a previous image which is displayed prior to the target image. Special effects can be given continuity between previous and next images, and an effective presentation which reflects contents in an image and gives continuity between display effects can be obtained without performing any cumbersome setting operation by the user.

Other objects and advantages besides those discussed above shall be apparent to those skilled in the art from the description of a preferred embodiment of the invention as follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a table illustrating an information table used to determine the parameter of a display effect in the first embodiment;

FIGS. 5A to 5C are views showing the operation of display control processing in the first embodiment;

FIGS. 6A to 6O are views showing display examples by display control processing in the first embodiment;

FIG. 10 is a table illustrating an information table used to determine the parameter of a display effect in the second embodiment;

FIG. 14 is a table illustrating a management table used for display control processing in the third embodiment.

DETAILED DESCRIPTION OF THE PREFERRED EMBODIMENTS

Preferred embodiments of the present invention will be described in detail below with reference to the accompanying drawings.

Note that embodiments to be described below are merely an example of an implementation means of the present invention, and should be properly modified or changed in accordance with the configuration of an apparatus and various conditions to which the present invention is applied. The present invention is not limited to the following embodiments.

First Embodiment

The first embodiment according to the present invention will be described below.

Figure 1:
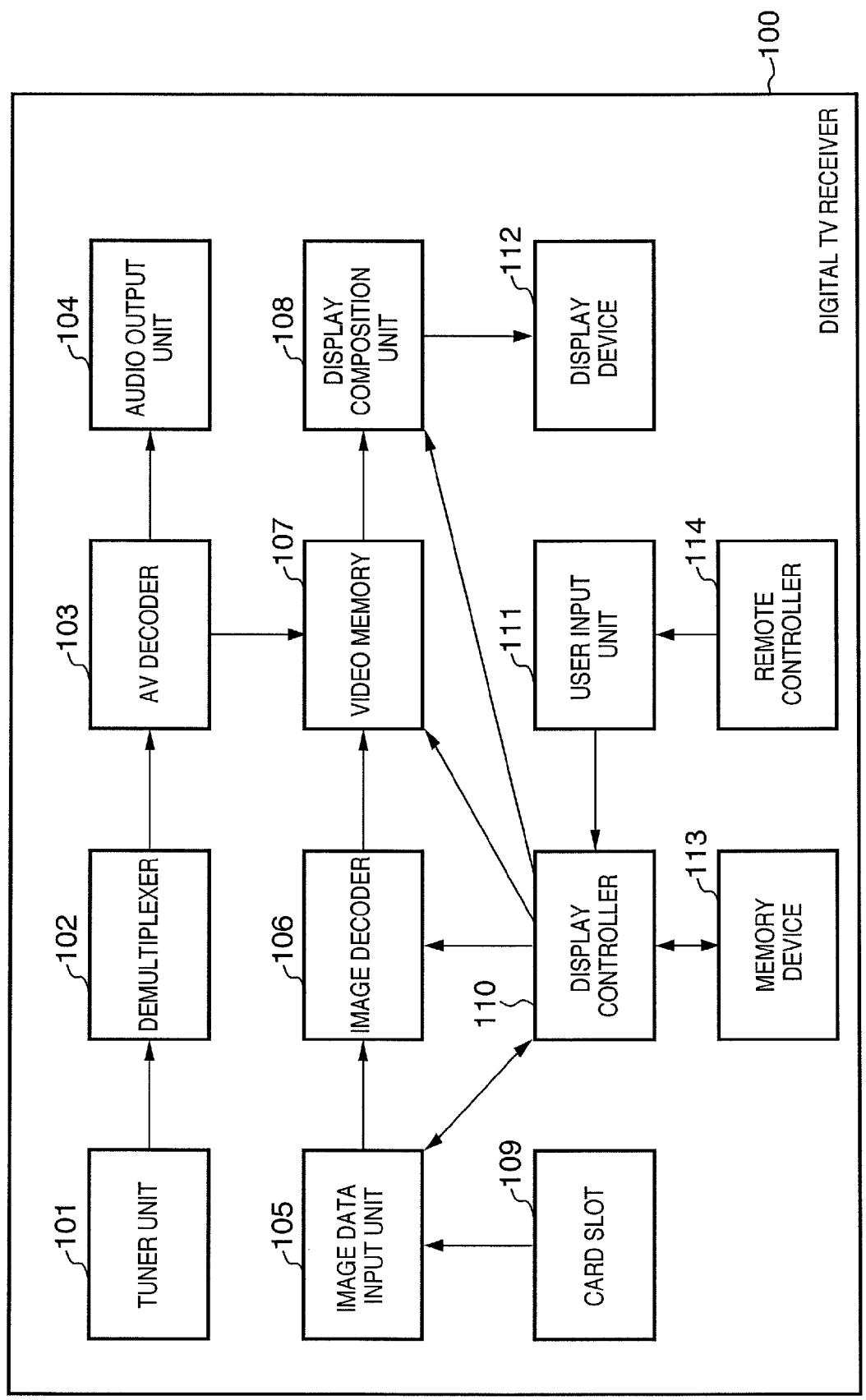
FIG. 1 is a block diagram showing the configuration of a digital TV receiver according to the first embodiment of the present invention.

FIG. 1 is a block diagram showing the configuration of a digital TV (television) receiver 100 to which the present invention is applied.

(Description of Units of Receiver)

In FIG. 1, a signal received by an antenna (not shown) is input to a tuner unit 101. The tuner unit 101 performs processes such as demodulation and error correction for the input signal to generate digital data of a so-called transport stream format. The tuner unit further descrambles the generated transport stream (TS) data, and outputs the descrambled data to a demultiplexer 102.

The demultiplexer 102 extracts video data and audio data from TS data which is input from the tuner unit 101 and contains video and audio data of a plurality of channels, electronic program guide (EPG) data, data broadcasting data, and the like that are multiplexed by time division. The demultiplexer 102 outputs the video data and audio data to an audio video (AV) decoder 103. The video data processed by the AV decoder 103 is written in a video memory 107, and output to a display device 112 via a display composition unit 108. The audio data is output from an audio output unit 104.

The first embodiment adopts a display device 112 of 960 pixels in the horizontal direction and 720 pixels in the vertical direction.

Reference numeral 109 denotes a card slot which connects a removable memory card or the like and is used to exchange data with a digital camera in the first embodiment. Reference numeral 105 denotes an image data input unit which loads digital image data from a memory card connected to the card slot 109. Reference numeral 106 denotes an image decoder which decodes digital image data input from the image data input unit 105.

Reference numeral 110 denotes a display controller which instructs the image data input unit 105 to load an image, the image decoder 106 to execute processing, the video memory 107 to write display data, the display composition unit 108 to perform composition processing, and the memory device 113 to store information. The display controller 110 acquires input data from a remote controller 114 via a user input unit 111, and acquires photographing data attached to digital image data via the image data input unit 105.

Figure 2:
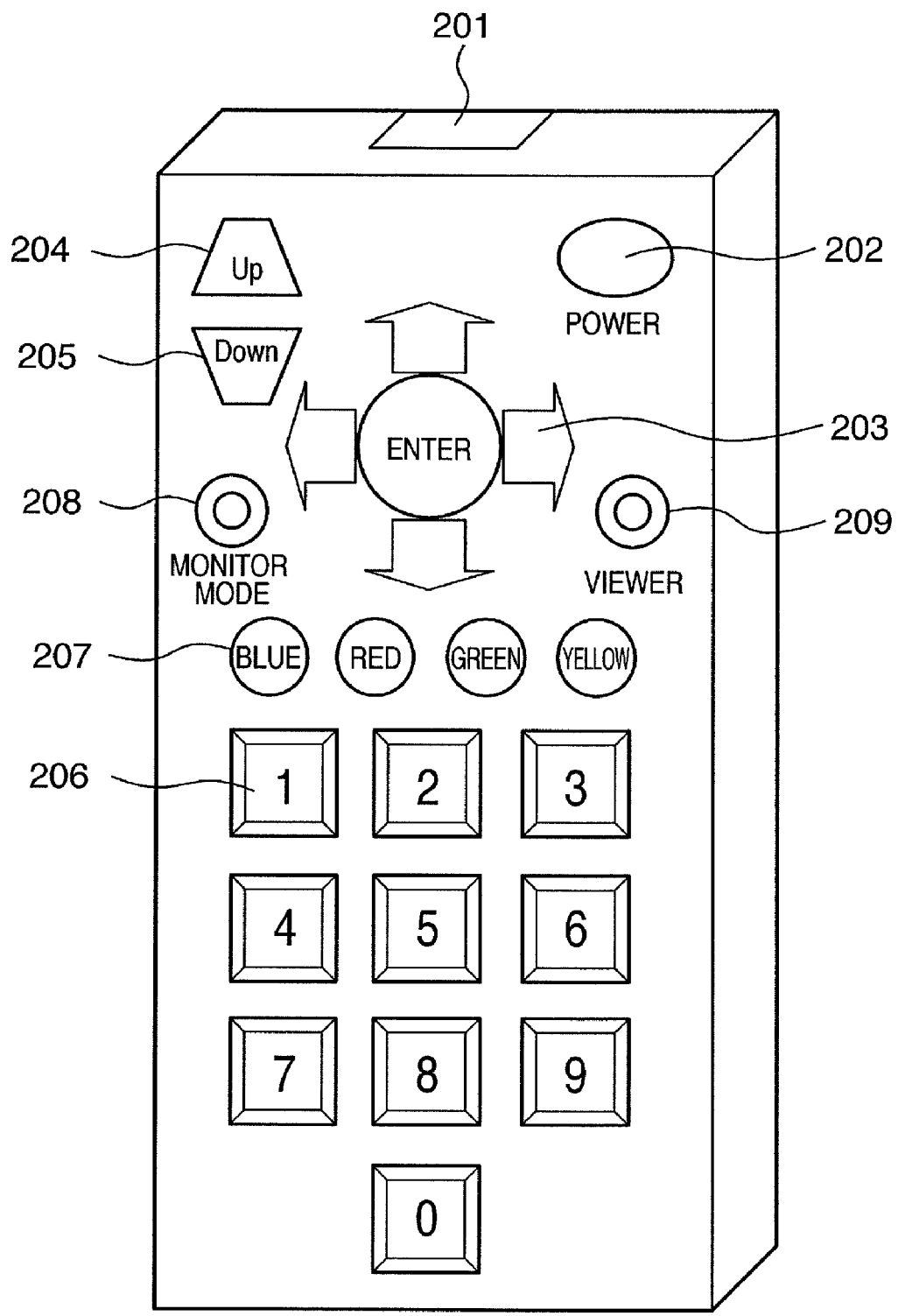
FIG. 2 is a view showing the remote controller of the digital TV receiver according to the embodiment.

FIG. 2 illustrates the remote controller 114. FIG. 2 shows only buttons to perform an operation for implementing functions necessary to describe the first embodiment. Buttons necessary for an actual receiver are not limited to them.

In FIG. 2, reference numeral 201 denotes a light emitter for performing infrared communication between the remote controller and the user input unit 111 in FIG. 1; 202, a power key for turning on/off the power supply; 203, a cursor & enter key having an enter key at the center of up, down, left, and right buttons; 204 and 205, Up/Down keys made up of two Up and Down buttons; 206, a numeric key pad on which figures of 1 to 9 and 0 are arrayed in a matrix; and 207, a color key pad on which buttons of four, blue, red, green, and yellow colors are arranged in a single horizontal line.

Reference numeral 208 denotes a monitor mode key for switching the display mode of the monitor of the digital TV receiver; and 209, a viewer key for calling an image viewer function.

A digital image used in the first embodiment is still image data photographed by a digital camera. Still image data is compressed by JPEG by the digital camera, recorded as a still image data file in a memory card, and then used. In the following description, an "image file" means still image data. For descriptive convenience, all still image data used in the first embodiment have a size of 1,600×1,200.

(Description of Operation)

Display of a digital image on the digital TV receiver 100 according to the first embodiment starts when the user inserts a memory card into the card slot 109 and calls the image viewer function by remote control.

Figure 3A:
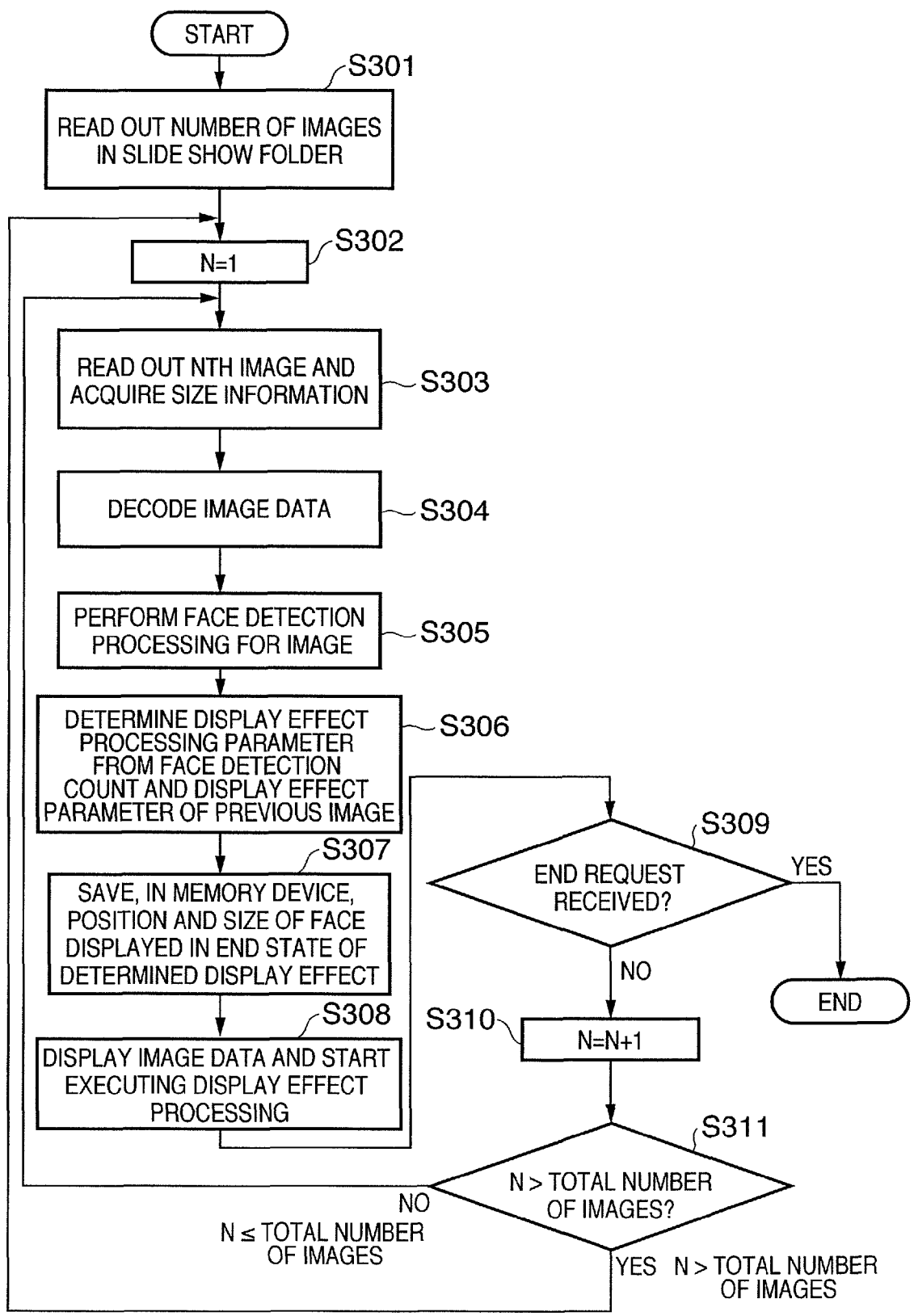
FIGS. 3A and 3B are flowcharts showing display control processing in the first embodiment.
Figure 3B:
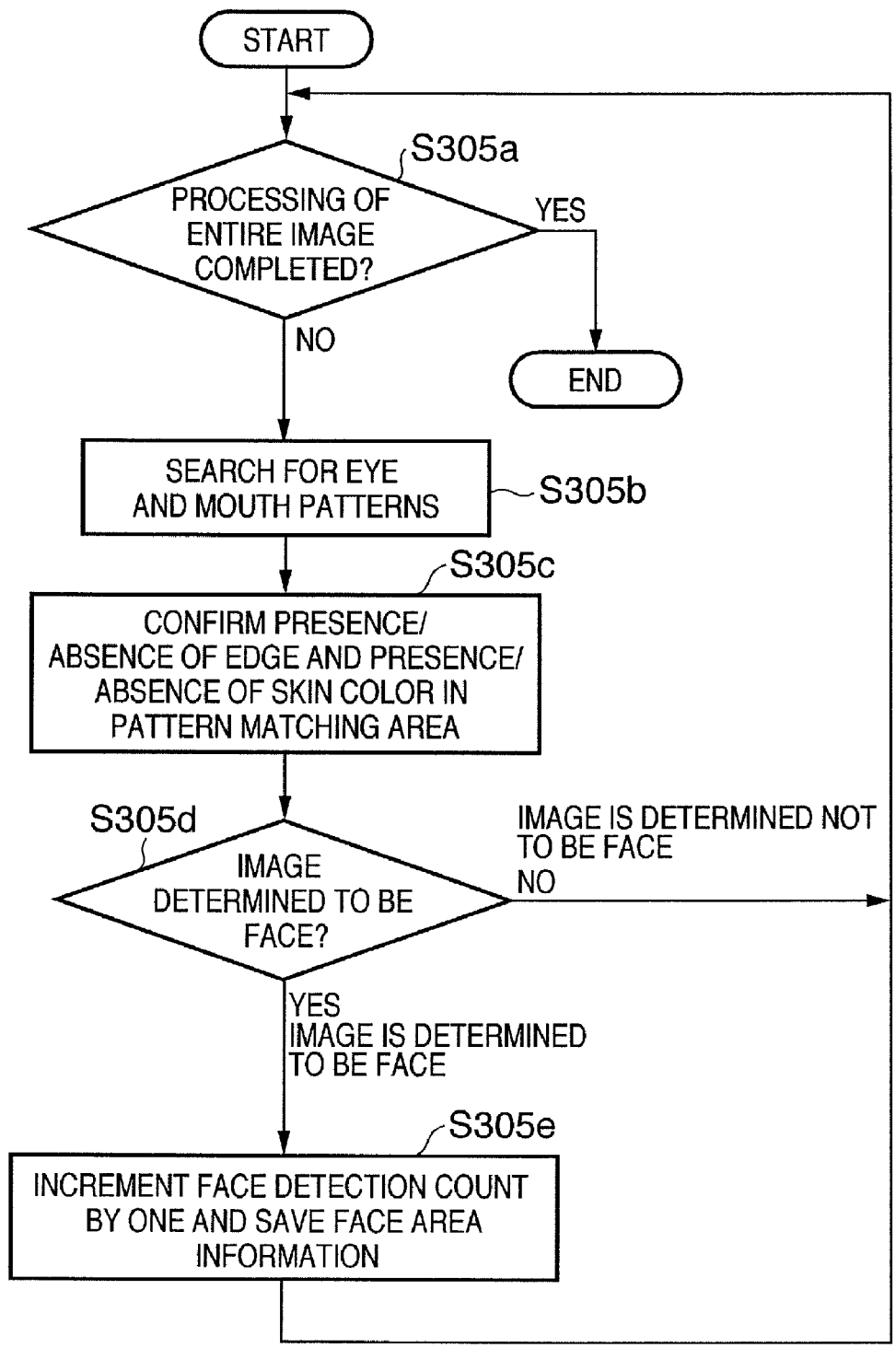

FIGS. 3A and 3B are flowcharts mainly showing the operation of the display controller 110 as for the operation of part of the image viewer function in the digital TV receiver. The operation will be explained with reference to FIGS. 3A and 3B.

(Start of Slide Show)

When the user presses the viewer key 209 of the remote controller shown in FIG. 2, the display controller 110 starts processing shown in FIG. 3A.

The display controller 110 reads out and stores, via the image data input unit 105, the total number of image files in a memory card inserted into the card slot 109 (S301). The display controller 110 reads out the image file of the first image to acquire the image size (S303). Then, the display controller 110 sends the image data to the image decoder 106 where the image data is decoded (S304). The display controller 110 performs face detection processing using the decoded image (S305).

(Processing for First Image)

In face detection processing, the display controller 110 searches the image for eye and mouth patterns which characterize the face. If the patterns are detected, the display controller 110 confirms the presence/absence of the skin color and the presence/absence of the edge, and determines whether the image is a face (S305a to S305e in FIG. 3B). If the display controller 110 determines that the image is a face, it increments the face detection count by one, and saves the face detection count in the memory device 113 together with face area information (center coordinates (X,Y) using the upper left end of image data as the origin and the radius r of the face area).

After the end of face detection processing for the first image, the display controller 110 executes display effect parameter determination processing for the first image on the basis of the result of face detection processing (S306). The display controller 110 selects a display effect on the basis of the number of detected faces and the display effect of a previous image by using a table shown in FIG. 4. Note that a display state at the end of the display effect is described in parentheses ( ) in FIG. 4.

For example, when the number of faces detected in the first image is one, the display effect of a previous image is "none". Thus, composition processing with the previous image is "none", and display effect processing "zoom in from an entire image to a face area" is selected as the display effect of the first image. The processing contents of the zoom-in display effect will be described later.

The terms "zoom" and "zooming" do not always mean extracting and enlarging part of image data. Processing of changing, e.g., 1,600×1,200 image data used in the first embodiment as if the image were partially enlarged from a reference image which is reduced and displayed on the full screen (960×720) is called "zoom" or "zooming". In the above example, "zoom" or "zooming" means processing of first reducing 1,600×1,200 image data to ⅗ to display the image on the full screen (960×720), and then changing the zoom ratio so as to always keep the display at 960×720 while reducing the image extraction area and moving it close to the center of the face area.

After the display effect is selected, the display controller 110 determines display effect parameters (for zoom-in, the start position and size of an extracted area rectangle, its end position and size, and the moving step per unit time) necessary for the display effect on the basis of face area position information stored in the memory device 113.

The display controller 110 saves, in the memory device 113, the selected display effect and information on the position and size of a face displayed in the end state of the display effect (S307).

On the basis of the determined display effect parameters, the display controller 110 instructs another processing (not shown) to display the image and start display effect execution processing (S308). In another processing inside the display controller, display effect processing is executed by successively drawing display data in the video memory in accordance with the display effect parameters while changing conditions. After that, the display controller 110 repetitively performs the same processing for each image N (S310 and S311) until an end request is received (S309).

(Processing for Second Image)

During display effect processing for the first image, the display controller 110 reads out the image file of the second image to acquire the image size (S303). Then, the display controller 110 sends the image data to the image decoder 106 where the image data is decoded (S304) The display controller 110 performs face detection processing using the decoded image (S305), and saves the result in the memory device 113.

After the end of face detection processing for the second image, the display controller 110 executes display effect parameter determination processing for the second image by using the table in FIG. 4 on the basis of the result of face detection processing and the result of display effect selection for the previous image that is stored in the memory device (S306). When the number of faces detected in the second image is one, a display effect "zoom out after zoom display of a face area" is selected for the second image in accordance with the table because the display effect "zoom in" has been selected for the first image by the above-described processing.

As shown in the table of FIG. 4, this face area zoom display means processing having a start condition to display a face area at the same position and size as those of a previous image in the final face area zoom state. As composition processing with an image, "α composition with a previous image" is selected. That is, this display effect is to, while displaying a face area at the same position and size as those of a previous image, switch the display using a composition with the previous image, then gradually decrease the zoom ratio, and display the entire image.

After the display effect is selected, the display controller 110 determines display effect parameters (for zoom-out, the start position and size of an extracted area rectangle, its end position and size, and the moving step per unit time) necessary for the display effect on the basis of face area position information stored in the memory device 113.

The display controller 110 saves, in the memory device 113, the selected display effect and information on the position and size of a face displayed in the end state of the display effect (S307).

On the basis of the display effect parameters determined by the processing of S306, the display controller 110 instructs another processing (not shown) to start display effect execution processing (S308). In another processing inside the display controller, after display effect control of the first image ends, display effect processing is executed by successively drawing display data in the video memory in accordance with the display effect parameters determined for the second image while changing conditions.

(Processing for Third Image)

During display effect control processing for the second image, the display controller 110 reads out the image file of the third image to acquire the image size (S303). Then, the display controller 110 sends the image data to the image decoder 106 where the image data is decoded (S304). The display controller 110 performs face detection processing using the decoded image (S305), and saves the result in the memory device 113.

After the end of face detection processing for the third image, the display controller 110 executes display effect parameter determination processing for the third image by using the table in FIG. 4 on the basis of the result of face detection processing and the result of display effect selection for the previous image (S306). When the number of faces detected in the third image is two, a display effect "panning between face areas at two ends" is selected in accordance with the table in FIG. 4 because the display effect "zoom out" has been selected for the second image. In accordance with the table, neither α composition switching from the previous image nor conditional processing of making the position and size of a face area match with those in the previous image is particularly performed.

After the display effect is selected, the display controller 110 determines display effect parameters (for panning, the start position and size of an extracted area rectangle, its end position and size, and the moving step per unit time) necessary for the display effect on the basis of face area position information stored in the memory device 113.

The display controller 110 saves, in the memory device 113, the selected display effect and information on the position and size of a face displayed in the end state of the display effect (S307).

On the basis of the display effect parameters determined by the processing of S306, the display controller 110 instructs another processing (not shown) to start display effect execution processing (S308). In another processing inside the display controller, after display effect control of the second image ends, display effect processing is executed by successively drawing display data in the video memory in accordance with the display effect parameters determined for the third image while changing conditions.

(Processing for Fourth Image)

During display effect processing control for the third image, the display controller 110 reads out the image file of the fourth image to acquire the image size (S303). Then, the display controller 110 sends the image data to the image decoder 106 where the image data is decoded (S304) The display controller 110 performs face detection processing using the decoded image (S305), and saves the result in the memory device 113.

After the end of face detection processing for the fourth image, the display controller 110 executes display effect parameter determination processing for the fourth image by using the table in FIG. 4 on the basis of the result of face detection processing and the result of display effect selection for the previous image that is stored in the memory device (S306). When the number of faces detected in the fourth image is one, the display effect "zoom out after zoom display of a face area" is selected for the fourth image in accordance with the table because the display effect "panning" has been selected for the third image by the above-described processing.

As shown in the table of FIG. 4, this face area zoom display means processing having a start condition to display a face area at the same position and size as those of a previous image in the final face area zoom state. As composition processing with an image, "a composition with a previous image" is selected. That is, this display effect is to, while displaying a face area at the same position and size as those of a previous image, switch the display using α composition with the previous image, then gradually decrease the zoom ratio, and display the entire image.

After the display effect is selected, the display controller 110 determines display effect parameters (for zoom-out, the start position and size of an extracted area rectangle, its end position and size, and the moving step per unit time) necessary for the display effect on the basis of face area position information stored in the memory device 113.

The display controller 110 saves, in the memory device 113, the selected display effect and information on the position and size of a face displayed in the end state of the display effect (S307).

On the basis of the display effect parameters determined by the processing of 8306, the display controller 110 instructs another processing (not shown) to start display effect execution processing (S308). In another processing inside the display controller, after display effect control of the third image ends, display effect processing is executed by successively drawing display data in the video memory in accordance with the display effect parameters determined for the fourth image while changing conditions.

FIGS. 5A to 5C are views showing states of display effect processing performed by the display controller 110.

For example, FIG. 5A shows an example of a change (a→b in FIG. 5A) of the extracted area in the display effect "zoom in from an entire image to a face area" and a change (c→d in FIG. 5A) of the face area on the display screen. More specifically, an extracted area "a" is displayed on the entire screen. Then, while the extracted area is slowly downsized to come close to the face area, images are successively drawn in the video memory. When the extracted area reaches an area "b", the drawing processing ends. This appears as a change from c to d on the display screen.

FIG. 5B shows an example of a change (e→f in FIG. 5B) of the extracted area in the display effect "zoom out from a face area zoom state" and a change (g →h in FIG. 5B) of the face area on the display screen.

FIG. 5C shows an example of a change (i→j→k in FIG. 5C) of the extracted area in the display effect "panning" and a change (l→m→n in FIG. 5C) of the face area on the display screen.

(Operation)

Figure 8C:
FIGS. 8A to 8C are views illustrating images used in the second embodiment.
Figure 8B:
Figure 8A:

FIGS. 6A to 6O show examples of the display results of the above-described processing by the display controller 110. FIGS. 6A to 6O show display examples when images shown in FIGS. 8A to 8C are displayed by a slide show. FIGS. 6A to 6D represent display results in order of time when the first image is an image in FIG. 8A. FIGS. 6E to 6H represent display results of an image in FIG. 8B which is the second image.

As for the single image in FIG. 8B, the number of face areas is one, and the feature area of the image can be emphasized regardless of which of the display effects "zoom in to a face area" and "zoom out after zoom display of a face area" is selected. However, display continuity with a previous image is taken into consideration in the processing of the display controller 110 according to the first embodiment. Thus, when display effect processing of the first image is "zoom in", the display effect of the second image is "zoom out" in which the display starts from the zoom state. In this case, the "zoom out" display has, as the start condition, a condition to zoom and display a face area so as to match with the face position and size of a previous image, as shown in FIG. 4. This display effect has continuity with a display effect added to a previous image. When the end state of the first image is "face zoom state", "α composition display" is selected between the display effects of the first and second images, i.e., between FIGS. 6D and 6E, and a display effect of higher continuity is implemented.

FIGS. 6I to 6K represent display results in order of time when the third image is an image in FIG. 8C. FIGS. 6L to 6O represent display results when the image in FIG. 8A is displayed again as the fourth image. As for the single image in FIG. 8A, the number of face areas is one, and the feature area of the image can be emphasized regardless of which of the display effects "zoom in to a face area" and "zoom out after zoom display of a face area" is selected. However, display continuity with a previous image is taken into consideration in the processing of the display controller 110 according to the first embodiment. For this reason, when display effect processing of the third image is "panning", "zoom out" is selected to select a display effect having continuity with the display effect added to the previous image, i.e., the image in FIG. 8C. Since "α composition display" is selected between the display effects of the third and fourth images, i.e., between FIGS. 6K and 6L, a display effect of higher continuity is obtained.

Second Embodiment

The second embodiment according to the present invention will be described below.

Figure 7:
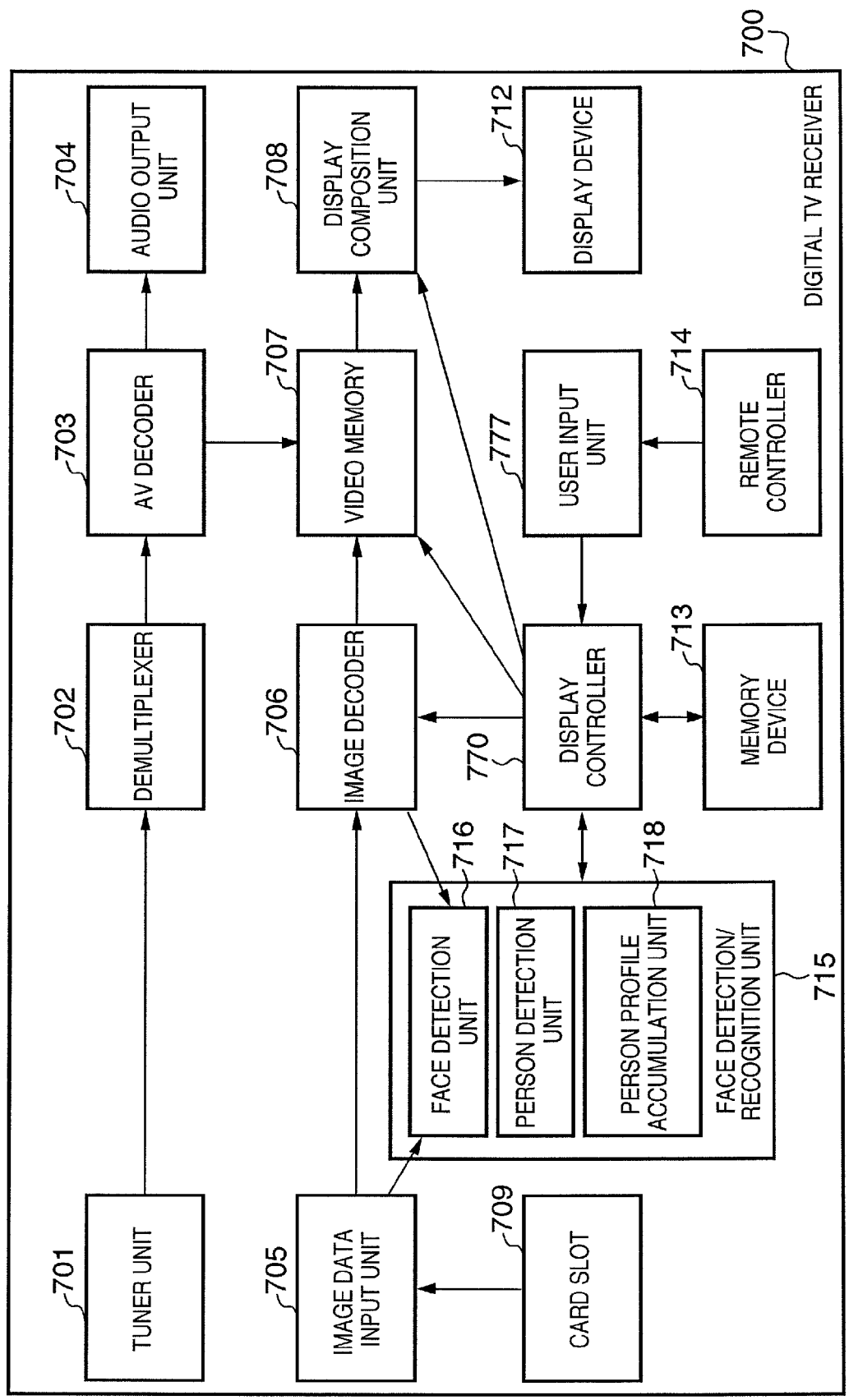
FIG. 7 is a block diagram showing the configuration of a digital TV receiver according to the second and third embodiments.

FIG. 7 is a block diagram showing the configuration of a digital TV receiver 700 to which the present invention is applied.

Note that a remote controller used in the second embodiment is identical to that in FIG. 2.

(Description of Units)

In FIG. 7, a tuner unit 701, demultiplexer 702, AV decoder 703, image data input unit 705, video memory 707, display composition unit 708, card slot 709, and audio output unit 704 are identical to those in the first embodiment, and a description thereof will be omitted.

The second embodiment adopts a display device 712 of 960 pixels in the horizontal direction and 720 pixels in the vertical direction.

Reference numeral 706 denotes an image decoder which decodes digital image data input from the image data input unit 705.

Reference numeral 710 denotes a display controller which instructs the image data input unit 705 to load an image, the image decoder 706 to execute processing, the video memory 707 to write display data, the display composition unit 708 to perform composition processing, and a memory device 713 to store information. The display controller 710 acquires input data from a remote controller 714 via a user input unit 711.

Reference numeral 715 denotes a face detection/recognition unit made up of a face detection unit 716 which detects a face from an image, a person profile accumulation unit 718 which accumulates profile information of each person in advance, and a person detection unit 717. The person detection unit 717 determines the person of a detected face by comparing a detection result by the face detection unit 716 with profile information accumulated in the person profile accumulation unit 718. In the second embodiment, assume that the profiles of two persons A and B are registered in advance in the person profile accumulation unit.

For descriptive convenience, all image data used have a size of 1,600×1,200 in the second embodiment, too.

(Description of Operation)

Display of a digital image on the digital TV receiver 700 according to the second embodiment starts when the user inserts a memory card into the card slot 709 and calls the image viewer function by operating the remote controller 714.

Figure 9A:
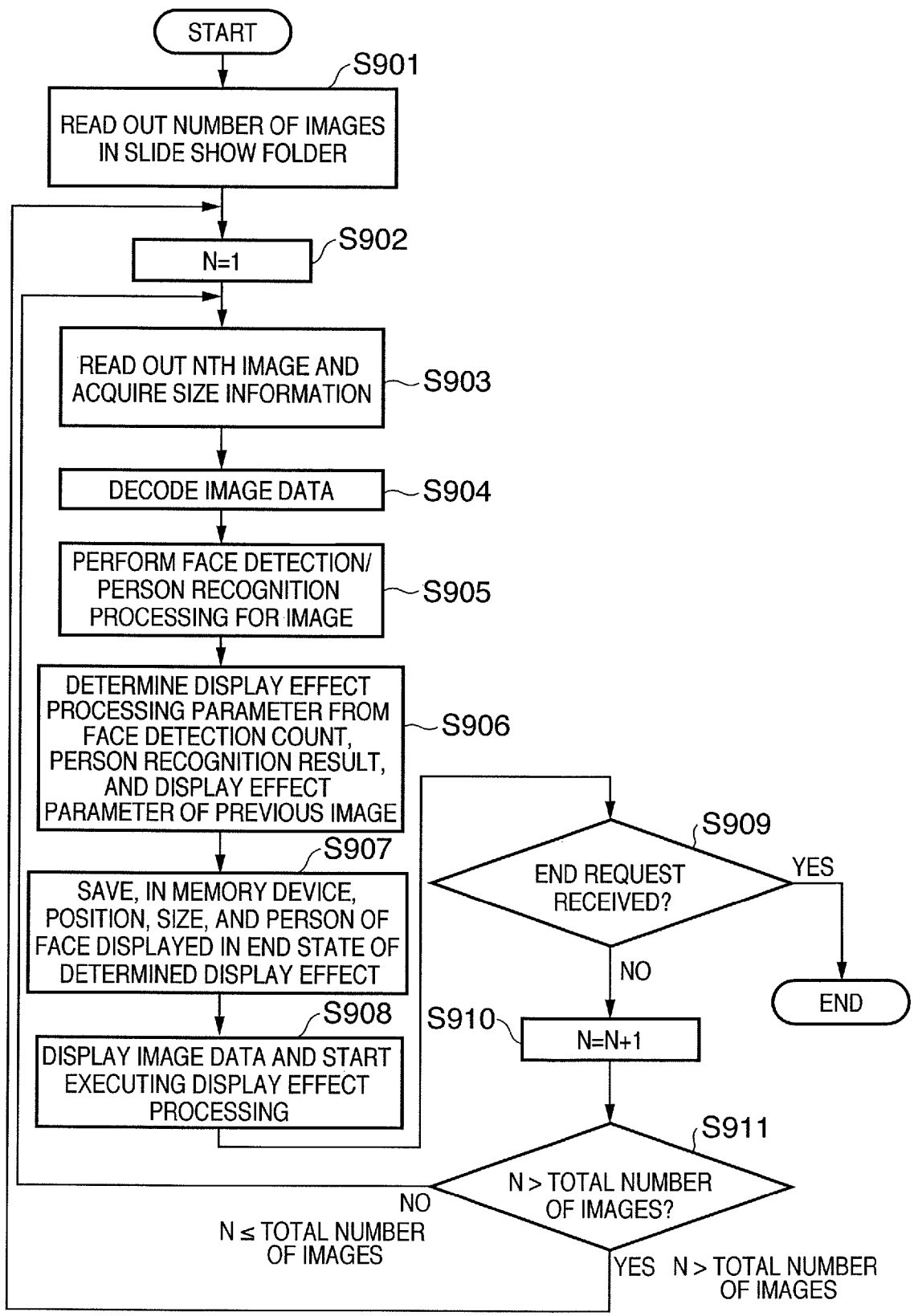
FIGS. 9A and 9B are flowcharts showing face detection/recognition processing and display control processing in the second embodiment.
Figure 9B:
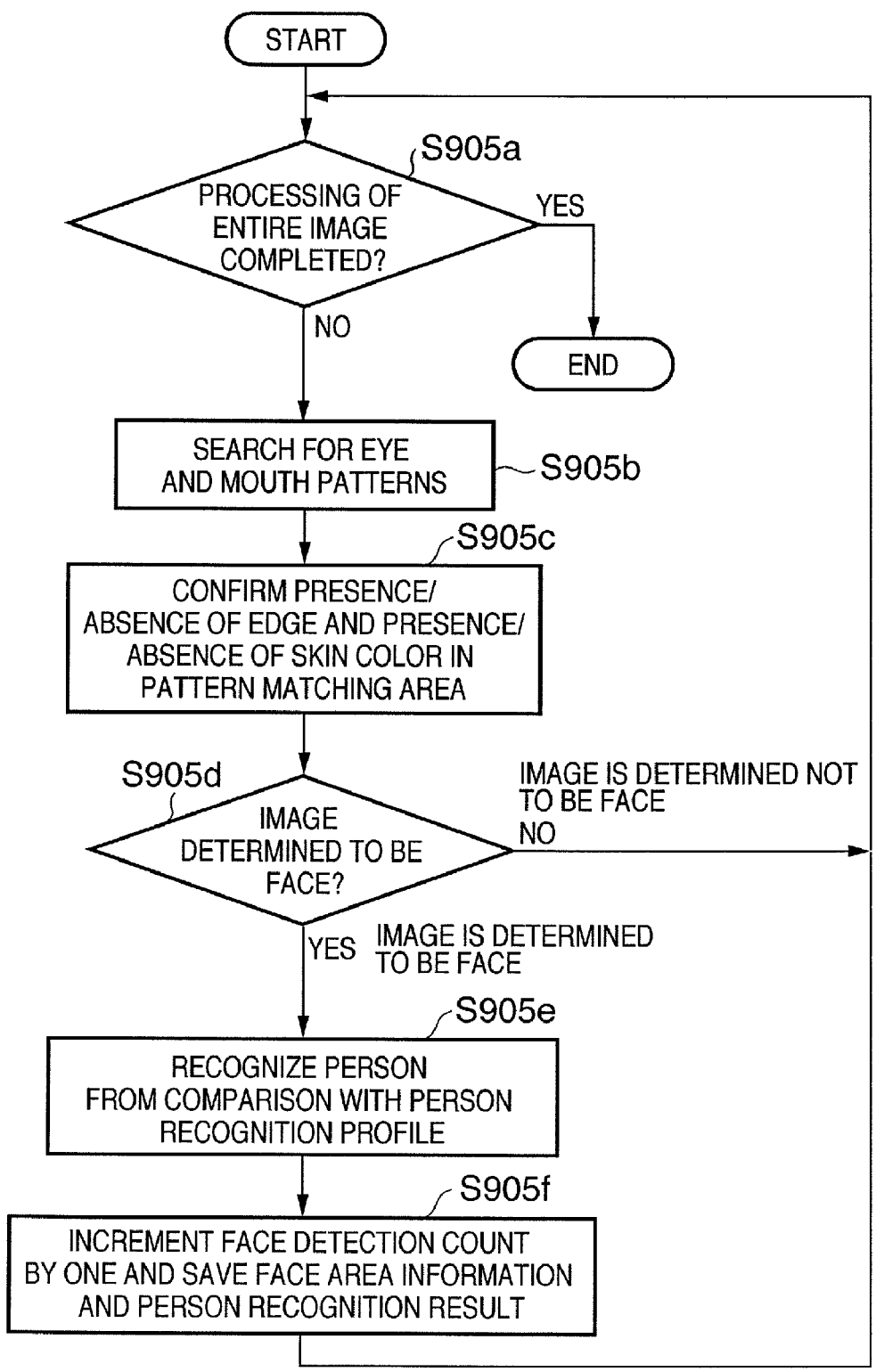

FIGS. 9A and 9B are flowcharts mainly showing the operations of the display controller 710 and face detection/recognition unit 715 as for the operation of part of the image viewer function in the digital TV receiver 700.

(Start of Slide Show)

When the user presses a viewer key 209 of the remote controller 714 shown in FIG. 2, the display controller 710 starts processing shown in FIG. 9A.

The display controller 710 reads out and stores, via the image data input unit 705, the total number of image files in a memory card inserted into the card slot 709 (S901). The display controller 710 reads out the image file of the first image to acquire the image size (S903). Then, the display controller 710 sends the image data to the image decoder 706 where the image data is decoded (S904). The display controller 710 sends the decoded image to the face detection/recognition unit 715 where face detection and person recognition processing are performed (S905).

(Processing for First Image)

In the face detection/recognition unit 715, the face detection unit 716 searches the input image for eye and mouth patterns which characterize the face. If the patterns are detected, the face detection unit 716 confirms the presence/absence of the skin color and the presence/absence of the edge, and determines whether the image is a face (S905a to S905e in FIG. 9B). If the face detection unit 716 determines that the image is a face, the image of the face area is sent to the person detection unit 717. The person detection unit 717 compares the image of the face area with person profile information accumulated in the person profile accumulation unit 718, and determines whether the person is registered person A or B or an unregistered person (S905e). Thereafter, the face detection/recognition unit 715 saves the number of detected faces, the position and size of each face, and the person determination result in the memory device 713 (S905f).

After the end of face detection/recognition processing for the first image, the display controller 710 executes display effect parameter determination processing for the first image on the basis of the result of face detection/recognition processing (S906). In display effect parameter determination processing, the display controller 710 selects a display effect on the basis of the number of detected faces and the display effect of a previous image by using a table shown in FIG. 10. Note that a display state at the end of the display effect is described in parentheses ( ) in FIG. 10.

For example, when the number of faces detected in the first image is one, the display effect of a previous image is "none". Thus, composition processing with a previous image is "none", and a display effect "zoom in from an entire image to a face area" is selected as the display effect of the first image.

After the display effect is selected, the display controller 710 determines display effect parameters (for zoom-in, the start position and size of an extracted area rectangle, its end position and size, and the moving step per unit time) necessary for the display effect on the basis of face area position information stored in the memory device 713.

The display controller 710 saves, in the memory device 713, the selected display effect and information on the position, size, and person of a face displayed in the end state of the display effect (S907).

On the basis of the determined display effect parameters, the display controller 710 instructs another processing (not shown) to display the image and start display effect execution processing (8908). In another processing inside the display controller, display effect processing is executed by successively drawing display data in the video memory in accordance with the display effect parameters while changing conditions. After that, the display controller 710 repetitively performs the same processing for each image N (S910 and S911) until an end request is received (S909).

(Processing for Second Image)

During execution of display effect processing for the first image, the display controller 710 reads out the image file of the second image to acquire the image size (S903). Then, the display controller 710 sends the image data to the image decoder 706 where the image data is decoded (S904). The display controller 710 sends the decoded image to the face detection/recognition unit 715 where face detection/recognition processing is performed. The face detection/recognition unit 715 saves the result of face detection/recognition processing in the memory device 713.

After the end of face detection/recognition processing for the second image, the display controller 710 executes display effect parameter determination processing for the second image by using the table in FIG. 10 on the basis of the result of face detection and the result of display effect selection for the previous image that is stored in the memory device (S906). When the number of faces detected in the second image is two, a display effect "panning between face areas at two ends after zoom display of one face area" is selected as the display effect of the second image because the display effect "zoom in" has been selected for the first image. As shown in the table of FIG. 10, this panning display is processing having start conditions to display a face area at the same position and size as those of a previous image in the final face area zoom state, and to preferentially display the same person as that of the previous image. Preferential display of the same person means processing of, when the second image contains the faces of two persons, comparing this information with person information of a previous image in the end state that is saved in the memory device in the above-described processing of S907, and if the two images show the same person, determining display effect parameters (for panning, the start position and size of an extracted area rectangle, its end position and size, and the moving step per unit time) so as to preferentially display the same person.

Similarly in accordance with the table of FIG. 10, "α composition with a previous image" is determined as a switching effect condition.

The display controller 710 saves, in the memory device 713, the display effect which is selected and determined for the second image by the above-described processing, and information on the position, size, and person of a face displayed in the end state of the display effect (S907).

On the basis of the display effect parameters determined by the processing of S906, the display controller 710 instructs another processing (not shown) to start display effect execution processing (S908). In another processing inside the display controller 710, after display effect control of the first image ends, display effect processing is executed by successively drawing display data in the video memory in accordance with the display effect parameters determined for the second image while changing conditions.

(Operation)

Figure 11A:
FIGS. 11A to 11G are views showing display examples by display control processing in the second * embodiment.
Figure 11B:
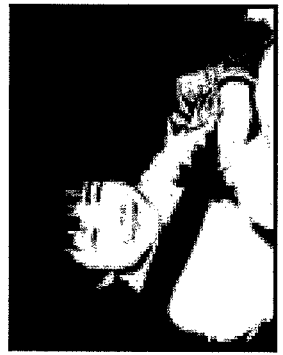
Figure 11C:
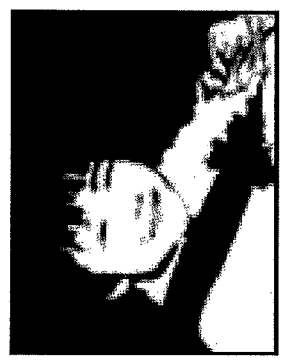
Figure 11D:
Figure 11E:
Figure 11F:
Figure 11G:
Figures 12A, 12B:
FIGS. 12A and 12B are views showing the result of face detection/recognition processing for an image in the second embodiment.

FIGS. 11A to 11G show examples of the display results of the above-described processing by the display controller 710. FIGS. 11A to 11G show display examples when images shown in FIGS. 12A and 12B are displayed by a slide show. FIGS. 11A to 11D represent display results in order of time when the first image is an image in FIG. 12A. FIGS. 11E to 11G represent, in order of time, display results of an image in FIG. 12B which is the second image. Similar to the first embodiment, the condition to zoom and display a face area so as to match with the face position and size of a previous image in the end state is added as a condition to start the display effect of the second image. Hence, faces are displayed at the same position and size in FIGS. 11D and 11E. Although not shown in FIGS. 11A to 11G, the condition "α composition display" is also added as a switching effect, and displays in FIGS. 11D and 11E become continuous.

As for the single image in FIG. 12B, the number of face areas is two, and the feature area of the image can be emphasized by the display effect "panning between face areas at two ends". The same presentation effect is obtained regardless of, for example, whether the display effect proceeds in order of FIGS. 11E, 11F, and 11G or FIGS. 11G, 11F, and 11E, in other words, whether persons are panned and displayed preferentially from person A or B. However, continuity with a previous image is taken into consideration in the processing of the display controller 710 according to the second embodiment. For this purpose, display effect parameters are determined under the condition to preferentially display the face of the same person as one displayed in the end state of a previous image in addition to a condition on the face position and size. The same person (person B) is displayed (FIG. 11E) after FIG. 11D, and continuity with a previous image can be ensured in terms of the display contents.

Third Embodiment

The third embodiment according to the present invention will be described below.

Similar to the second embodiment, the third embodiment adopts the digital TV receiver shown in FIG. 7 and the remote controller shown in FIG. 2. Building components are basically the same, and a description thereof will be omitted. Assume that the profiles of threes persons A, B, and C are registered in advance in a person profile accumulation unit according to the third embodiment.

(Description of Operation)

Display of a digital image on a digital TV receiver 700 according to the third embodiment starts when the user inserts a memory card into a card slot 709 and calls the image viewer function by operating a remote controller 714.

Figure 13A:
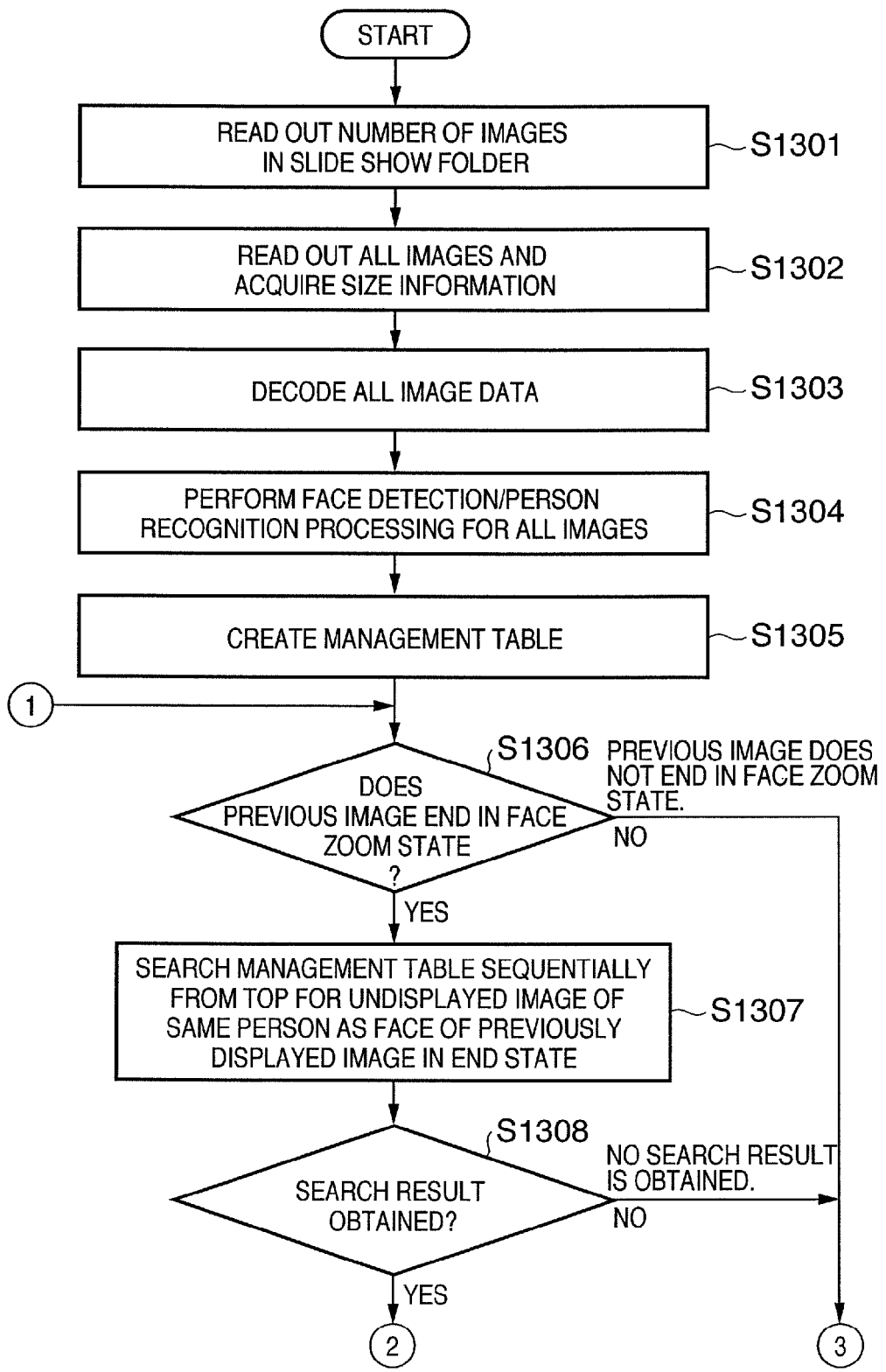
FIGS. 13A and 13B are flowcharts showing display control processing in the third embodiment.
Figure 13B:
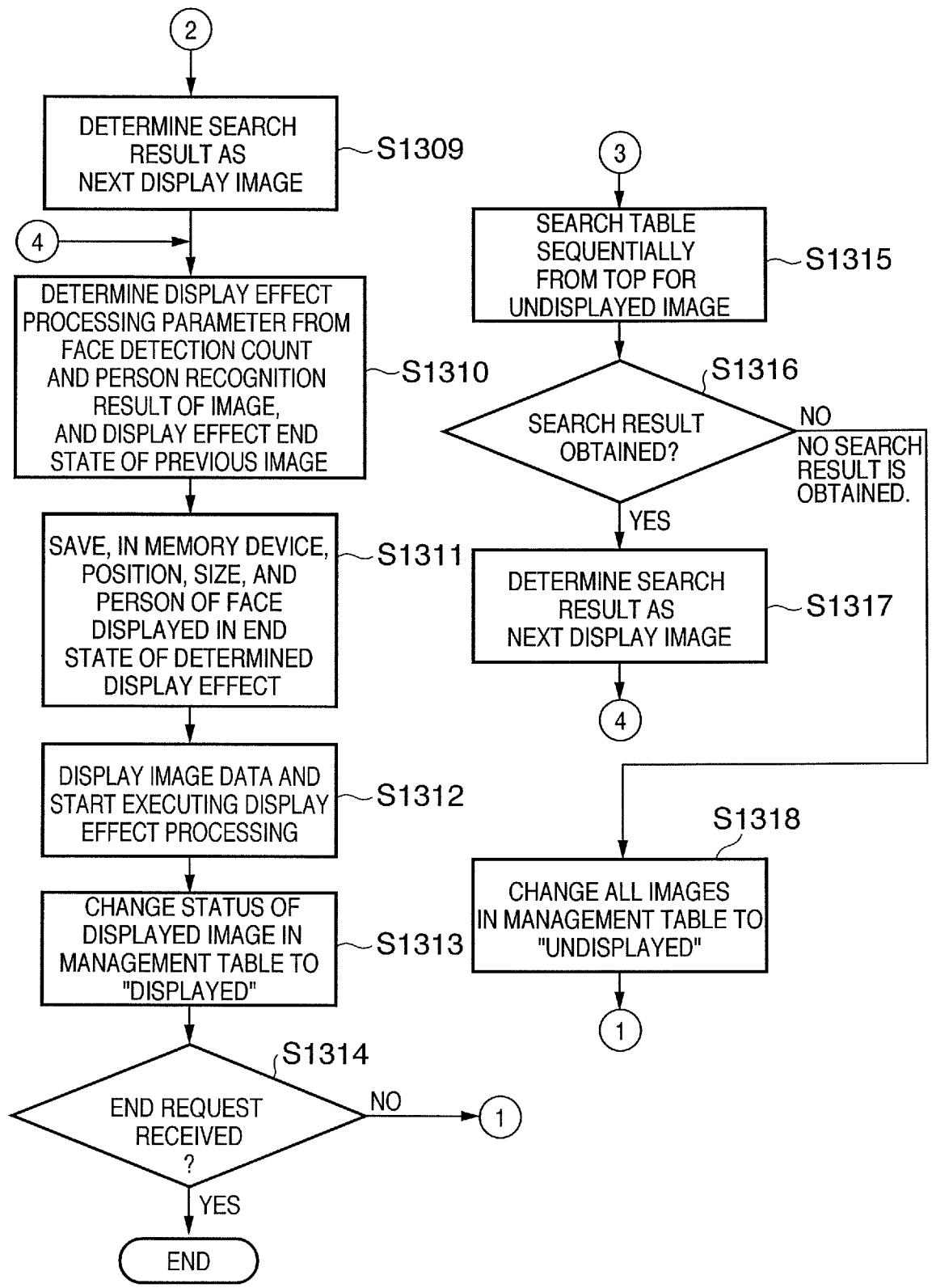

FIGS. 13A and 13B are flowcharts showing the operation of a display controller 710 as for the operation of part of the image viewer function in the digital TV receiver 700.

(Start of Slide Show)

When the user presses a viewer key 209 of the remote controller 714 shown in FIG. 2, the display controller 710 starts processing shown in FIG. 13A.

The display controller 710 reads out and stores, via an image data input unit 705, the total number of image files in a memory card inserted into the card slot 709 (S1301). The display controller 710 reads out all image files to acquire their image sizes (S1302), sends all the image data to an image decoder 706 where the image data are decoded (S1303). Then, the display controller 710 sends the decoded image to a face detection/recognition unit 715 where face detection and person recognition processing are performed (S1304).

In the face detection/recognition unit 715, a face detection unit 716 searches the input image for eye and mouth patterns which characterize the face. If the patterns are detected, the face detection unit 716 confirms the presence/absence of the skin color and the presence/absence of the edge, and determines whether the image is a face. If the face detection unit 716 determines that the image is a face, the image of the face area is sent to a face recognition unit 717. The face recognition unit compares the image of the face area with person profile information accumulated in a person profile accumulation unit 718, and determines whether the person is one of registered persons A, B, and C or an unregistered person. After that, the face detection/recognition unit 715 saves the number of detected faces, the position and size of each face, and the person determination result in a memory device 713.

After the end of face detection/recognition processing for all the images, the display controller 710 creates a management table shown in FIG. 14 on the basis of the results of face detection/recognition processing (S1305). The management table contains information on a file name, recognized person, and display status for each image file.

The display controller 710 checks the end state of a previous image. If the display has not started yet, the display controller 710 searches the management table sequentially from the top for an undisplayed image (SS135), and determines a detected image as a display image (S1317). In the management table as shown in FIG. 14, the first image IMG0001.jpg is determined as a display image. By using the table shown in FIG. 10, the display controller 710 executes display effect parameter determination processing on the basis of the face detection count, the person recognition result, and the end state of a previous image, similar to the second embodiment (S1310). The display controller 710 saves, in the memory device 713, information on the position, size, and person of a face displayed in the end state of the selected display effect (S1311).

On the basis of the determined display effect parameters, the display controller 710 instructs another processing (not shown) to display the image and start display effect execution processing (S1312). In another processing inside the display controller, display effect processing is executed by successively drawing display data in the video memory in accordance with the display effect parameters while changing conditions. After that, the display controller 710 changes the display status of a displayed image in the management table to "displayed" (S1313).

The display controller 710 returns to the processing of S1306 until an end request is received (S1314). When the end state of the display effect of a previous image is the face zoom state, the display controller 710 searches the management table in FIG. 14 sequentially from the top for an undisplayed image having the face recognition result of the same person as that of a previously displayed image in the end state (S1307). For example, when the first image in FIG. 14 is zoomed in and displayed as a previous image, the previous image ends in the face zoom state of person A, and thus the third image (IMG0003.jpg) having the face recognition result of person A is selected as the next image to be displayed (S1309).

As described above, the display controller 710 executes display effect parameter determination processing for the third image on the basis of the table in FIG. 10, and saves, in the memory device 713, information on the position, size, and person of a face displayed in the end state of the display effect (S1311). On the basis of the determined display effect parameters, the display controller 710 instructs another processing (not shown) to display the image and start display effect execution processing (S1312). The display controller 710 changes the display status of a displayed image in the management table to "displayed" (S1313).

(Operation)

Figure 15:
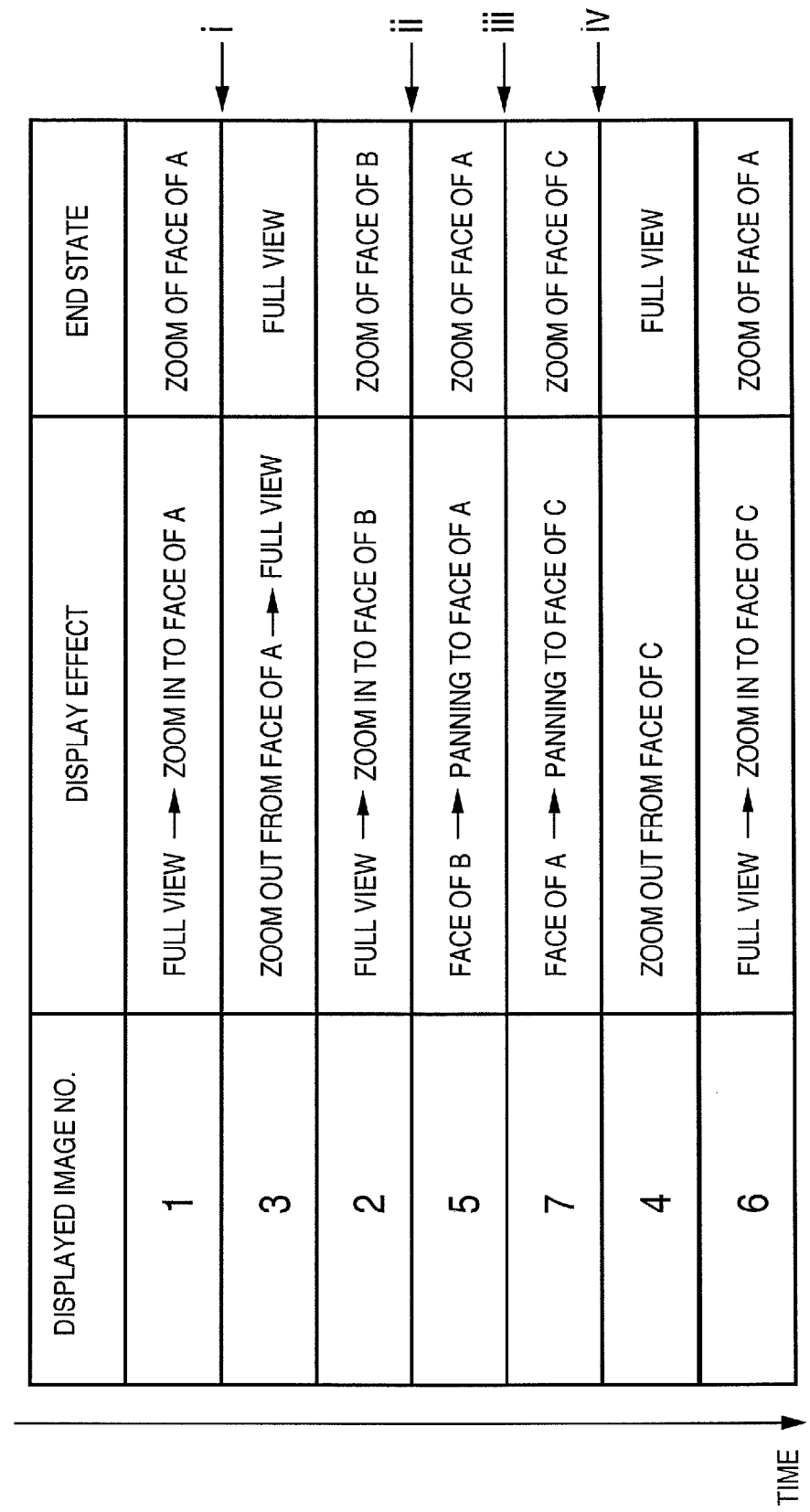
FIG. 15 is a table showing the order, display effect, and end state of a displayed image as results of display control processing in the third embodiment.

FIG. 15 shows an example of the operation results of the above-described processing by the display controller 710. FIG. 15 shows display results in order of time when a folder having images shown in FIG. 14 is displayed by the above-described processing of the display controller 710.

When a slide show starts, the first image in the management table is detected by the processing of S1315 and determined as a display image. The display effect "zoom in" is selected on the basis of the table shown in FIG. 10. The end state of the display effect is the face zoom state of person A.

It is determined by the processing of S1306 that the first image ends in the face zoom state, and the third image is determined as the next image to be displayed by the processing of S1307. "Zoom out" is determined as the display effect of the third image in accordance with the table in FIG. 10.

When the processing of S1306 is performed again, the second image is selected as an image to be displayed by the processing of S1315 because the end state of a previous image=zoom-out.

When the processing of S1306 is performed again, the fifth image is selected as the next image by the processing of S1307 because the end state of a previous image =the face zoom state of person B by the same processing. Panning display of changing from the face zoom state of person B to the face zoom state of person A is determined as the display effect in accordance with the table in FIG. 10.

As described above, according to the processing of the display controller 710 described in the third embodiment, an image having the face of the same person as that of a previous image is searched for, and the next image to be displayed is determined. Even if images containing the same person are not consecutively arranged, the chance to shift to the display effect of the next image while zooming and displaying the face of the same person can be increased. For example, when images are displayed in the order in the table of FIG. 14, the display can shift to the display effect of the next image only between the sixth and seventh images while zooming and displaying the face of the same person. However, the control of the third embodiment makes it possible to shift to the display effect of the next image at switching points (i) to (iv) in FIG. 15 while zooming and displaying the face of the same person. Similar to the second embodiment, the condition "α composition display" is also added as a switching effect, and display effect continuity can be enhanced.

As face detection processing, the above embodiments adopt a method of detecting the skin color in determining whether the image is a face. However, the gist of the present invention is not limited to this, and pattern matching using a template may also be used. The above embodiments have not described in detail a face recognition processing method, but the present invention may employ, e.g., a prior art disclosed in Japanese Patent Laid-Open No. 2005-56387. According to this method, a template called a standard face is used to search for a face area. Partial templates are used for feature point candidates such as the eye, nostril, and mouth to authenticate a person. The present invention may also use a method of performing matching between a face image having undergone affine transformation and contrast correction and a face registered in the learning database, and calculating the probability at which the face images represent the same person.

The above embodiments have explained zoom-in, zoom-out, and panning as display effects. However, the gist of the present invention is not limited to them, and another display effect may also be used.

INDUSTRIAL APPLICABILITY

In the description of the embodiments, the digital TV receiver has been exemplified as an embodiment of the present invention, but the gist of the present invention is not limited to this. For example, the present invention can also be applied to the form of a set-top box which plays back images photographed by a digital camera, or the form of software for a personal computer. The present invention can also be applied to the form of a digital camera having a slide show playback function.

The present invention can take an embodiment of a system, apparatus, method, program, storage medium (recording medium), or the like. More specifically, the present invention may be applied to a system including a plurality of devices or an apparatus formed by a single device.

The present invention is also achieved by supplying a software program (in the above embodiments, programs corresponding to the flowcharts shown in the drawings) for implementing the functions of the above-described embodiments to a system or apparatus directly or from a remote place, and reading out and executing the supplied program codes by the computer of the system or apparatus.

The present invention is therefore implemented by program codes installed in the computer in order to implement functional processing of the present invention by the computer. That is, the present invention includes a computer program for implementing functional processing of the present invention.

In this case, the present invention can take the form of an object code, a program executed by an interpreter, or script data supplied to an OS as far as a program function is attained.

Examples of a recording medium (storage medium) for supplying the program are a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet Web page via the browser of the client computer, and downloading the computer program of the present invention or a compressed file containing an automatic installing function from the Web page to a recording medium such as a hard disk. The program can also be implemented by grouping program codes which form the program of the present invention into a plurality of files, and downloading the files from different Web pages. That is, the present invention also includes a WWW server which allows a plurality of users to download the program files for implementing functional processing of the present invention by a computer.

The program of the present invention can be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are implemented when the computer executes the readout program codes. Also, the functions of the above-described embodiments are implemented when an OS or the like running on the computer performs part or all of actual processing on the basis of the instructions of the program.

The functions of the above-described embodiments are implemented when the program read out from the recording medium is written in the memory of a function expansion board inserted into the computer or the memory of a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-175380, filed Jun. 15, 2005, which is hereby incorporated by reference herein in its entirety.

What is claimed is:

1. An image display method of adding a special effect to a plurality of still images, changing the plurality of still images in time series, and sequentially displaying the plurality of still images by a slide show, comprising the following steps executed by an image display apparatus:

a detection step of detecting a face area from a still image which is subjected to display by the slide show;

a determination step of determining a content of the special effect used for a still image of which the face area is detected in said detection step on the basis of (a) a number of the detected face area and (b) a special effect used for a still image to be displayed by the slide show prior to the still image of which the face area is detected; and a display control step of displaying, with the use of the determined special effect, the still image of which the face area is detected, wherein in said determination step, when the number of the face area detected in said detection step from a first still image is one, (1) the special effect is determined to use zoom-in to the face area of the first still image if the special effect used for a second still image to be displayed by the slide show prior to the first still image is zoom-out from the face area of the second still image and (2) the special effect is determined to use zoom-out from the face area of the first still image if the special effect used for the second still image to be displayed by the slide show prior to the first still image is either (i) zoom-in to the face area of the second still image or (ii) panning between a plurality of face areas.

2. A non-transitory computer-readable storage medium storing a computer-executable program for implementing a method according to claim 1.

3. The image display method according to claim 1, wherein in said determination step, when the special effect is determined to use zoom-out from the face area of the first still image, a display position and size of the face area of the first still image at a start of displaying the first still image are made to match with a display position and size of the face area of the second still image at an end of displaying the second still image.

4. The image display method according to claim 1, wherein in said determination step, when the special effect is determined to use zoom-out from the face area of the first still image, it is determined to perform an α composition process when a display of the second still image is switched to a display of the first still image.

5. The image display method according to claim 1, wherein in said determination step, when a plurality of face areas are detected from the first still image in said detection step, the special effect is determined to use panning between the plurality of face areas of the first still image, and a display position and size of the face area of the first still image at a start of displaying the first still image are made to match with a display position and size of the face area of the second still image at an end of displaying the second still image, if the special effect used for the second still image to be displayed by the slide show prior to the first still image is either (i) zoom-in to the face area of the second still image or (ii) panning between the plurality of face areas of the second still image.

6. The image display method according to claim 1, wherein in said determination step, when a plurality of face areas are detected from the first still image in said detection step, the special effect is determined to use panning between the plurality of face areas of the first still image, and it is determined to perform an α composition process when a display of the second still image is switched to a display of the first still image, if the special effect used for the second still image to be displayed by the slide show prior to the first still image is either (i) zoom-in to the face area of the second still image or (ii) panning between the plurality of face areas of the second still image.

7. The image display method according to claim 1, further comprising a step of specifying a person from a face area detected by using a person recognition profile accumulated in advance,
wherein in said determination step, when a plurality of face areas are detected from the first still image in said detection step, the special effect is determined to use panning between the plurality of face areas of the first still image, and the special effect is determined to use panning from a face area of the same person as a person displayed at an end of displaying the second still image to a face area of another person, when the first still image contains the same person as the person displayed at the end of displaying the second still image to be displayed by the slide show prior to the first still image.

8. An image display apparatus which adds a special effect to a plurality of images, changes the plurality of still images in time series, and sequentially displays the plurality of still images by a slide show, said apparatus comprising:
a detection unit adapted to detect a face area from a still image which is subjected to display by the slide show;
a determination unit adapted to determine a content of the special effect used for a still image of which the face area is detected by said detection unit on the basis of (a) a number of the detected face area and (b) a special effect used for a still image to be displayed by the slide show prior to the still image of which the face area is detected; and
a display controller adapted to display, with the use of the determined special effect, the still image of which the feature area is detected,
wherein in said determination unit, when the number of the face area detected in said detection unit from a first still image is one, (1) the special effect is determined to use zoom-in to the face area of the first still image if the special effect used for a second still image to be displayed by the slide show prior to the first still image is zoom-out from the face area of the second still image and (2) the special effect is determined to use zoom-out from the face area of the first still image if the special effect used for the second still image to be displayed by the slide show prior to the first still image is either (i) zoom-in to the face area of the second still image or (ii) panning between a plurality of face areas.

9. The image display apparatus according to claim 8, wherein in said determination unit, when the special effect is determined to use zoom-out from the face area of the first still image, a display position and size of the face area of the first still image at a start of displaying the first still image are made to match with a display position and size of the face area of the second still image at an end of displaying the second still image.

10. The image display apparatus according to claim 8, wherein in said determination unit, when the special effect is determined to use zoom-out from the face area of the first still image, it is determined to perform an $\alpha$ composition process when a display of the second still image is switched to a display of the first still image.

11. The image display apparatus according to claim 8, wherein in said determination unit, when a plurality of face areas are detected from the first still image by said detection unit, the special effect is determined to use panning between the plurality of face areas of the first still image, and a display position and size of the face area of the first still image at a start of displaying the first still image are made to match with a display position and size of the face area of the second still image at an end of displaying the second still image, if the special effect used for the second still image to be displayed by the slide show prior to the first still image is either (i) zoom-in to the face area of the second still image or (ii) panning between the plurality of face areas of the second still image.

12. The image display apparatus according to claim 8, wherein in said determination unit, when a plurality of face areas are detected from the first still image by said detection unit, the special effect is determined to use panning between the plurality of face areas of the first still image, and it is determined to perform an $\alpha$ composition process when a display of the second still image is switched to a display of the first still image, if the special effect used for the second still image to be displayed by the slide show prior to the first still image is either (i) zoom-in to the face area of the second still image or (ii) panning between the plurality of face areas of the second still image.

13. The image display apparatus according to claim 8, further comprising a specifying unit that specifies a person from a face area detected by using a person recognition profile accumulated in advance,
wherein in said determination unit, when a plurality of face areas are detected from the first still image by said detection unit, the special effect is determined to use panning between the plurality of face areas of the first still image, and the special effect is determined to use panning from a face area of the same person as a person displayed at an end of displaying the second still image to a face area of another person, when the first still image contains the same person as the person displayed at the end of displaying the second still image to be displayed by the slide show prior to the first still image.

* * * * *